Jan. 9, 1951   D. W. PETERSON   2,537,852
FLOUR SIFTING ATTACHMENT FOR MECHANICAL BEATERS
Filed Aug. 30, 1948   2 Sheets-Sheet 1

Inventor
Dean W. Peterson
By Attorneys
Merchant & Merchant

Jan. 9, 1951 — D. W. PETERSON — 2,537,852
FLOUR SIFTING ATTACHMENT FOR MECHANICAL BEATERS
Filed Aug. 30, 1948 — 2 Sheets-Sheet 2
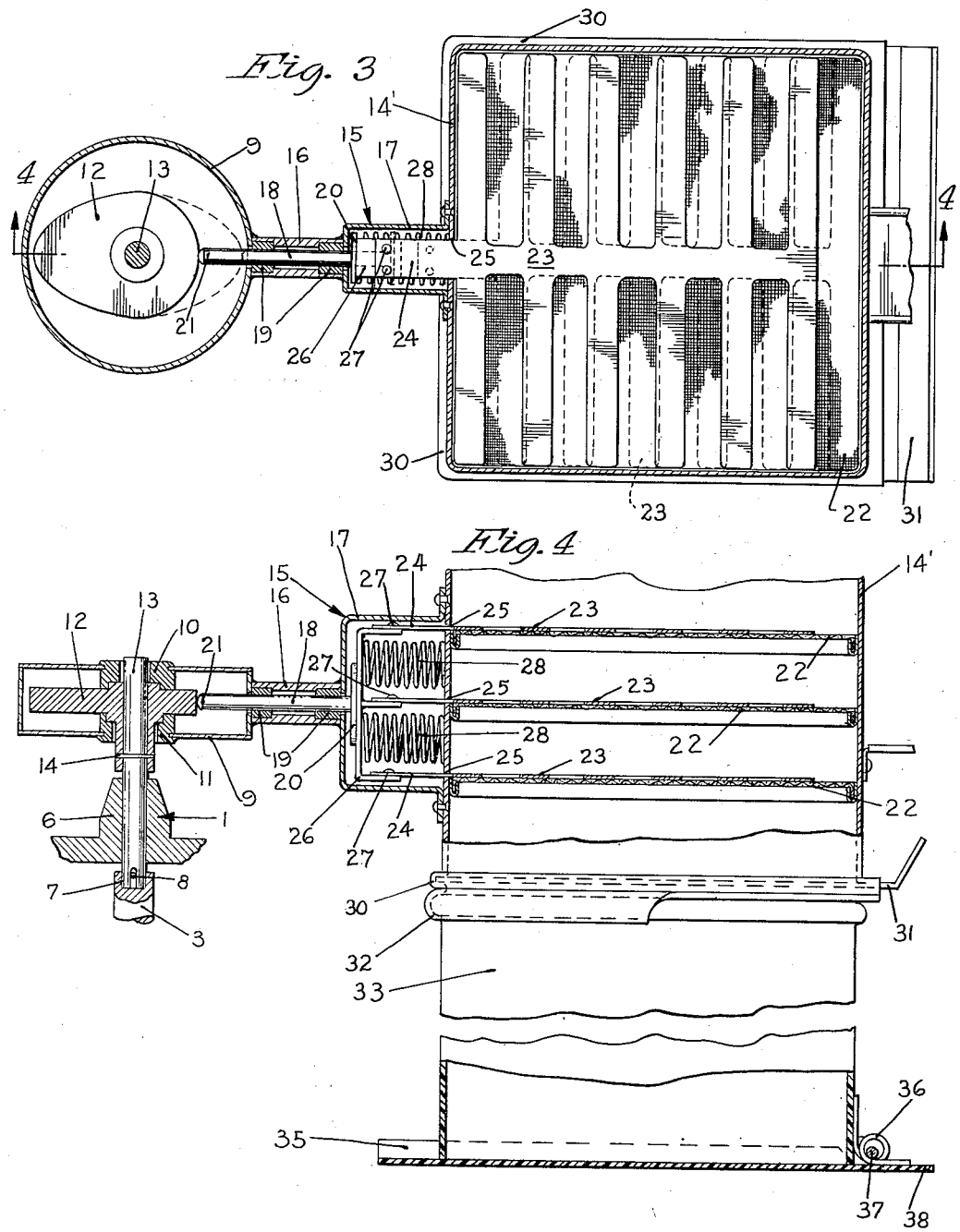
Inventor
Dean W. Peterson
By Attorneys
Merchant & Merchant Patented Jan. 9, 1951

2,537,852

UNITED STATES PATENT OFFICE 2,537,852

FLOUR SIFTING ATTACHMENT FOR MECHANICAL BEATERS

Dean W. Peterson, Minneapolis, Minn.

Application August 30, 1948, Serial No. 46,781

1 Claim. (Cl. 209—355)

My present invention relates to mechanical flour sifting devices, particularly of the type adapted to be used in combination with mechanical mixers or beaters, such as the well-known "Mix-master."

The primary object of my invention is the provision of a device of the type above described which may be coupled to and removed from a power beater with a minimum of time and effort, and which will deliver flour or other material being sifted directly into the mixing bowl conventionally positioned on said mixer.

Another object of my invention is the provision of a device of the type above described which is positive, efficient and completely sanitary in its action.

Another object of my invention is the provision of a device of the type above described, which is inexpensive to construct, relatively light in weight, and which is fool-proof and durable in construction.

The above and still further objects of my invention will become apparent from the following detailed specification, appended claim, and attached drawings.

Referring to the drawings, wherein like characters indicate like parts throughout the several views:

Fig. 3 is an enlarged view, partly in plan and partly in section, taken substantially on the line 3—3 of Fig. 1; and Fig. 4 is a fragmentary view, partly in elevation and partly in axial section, taken substantially on the line 4—4 of Fig. 3.

Figure 1:
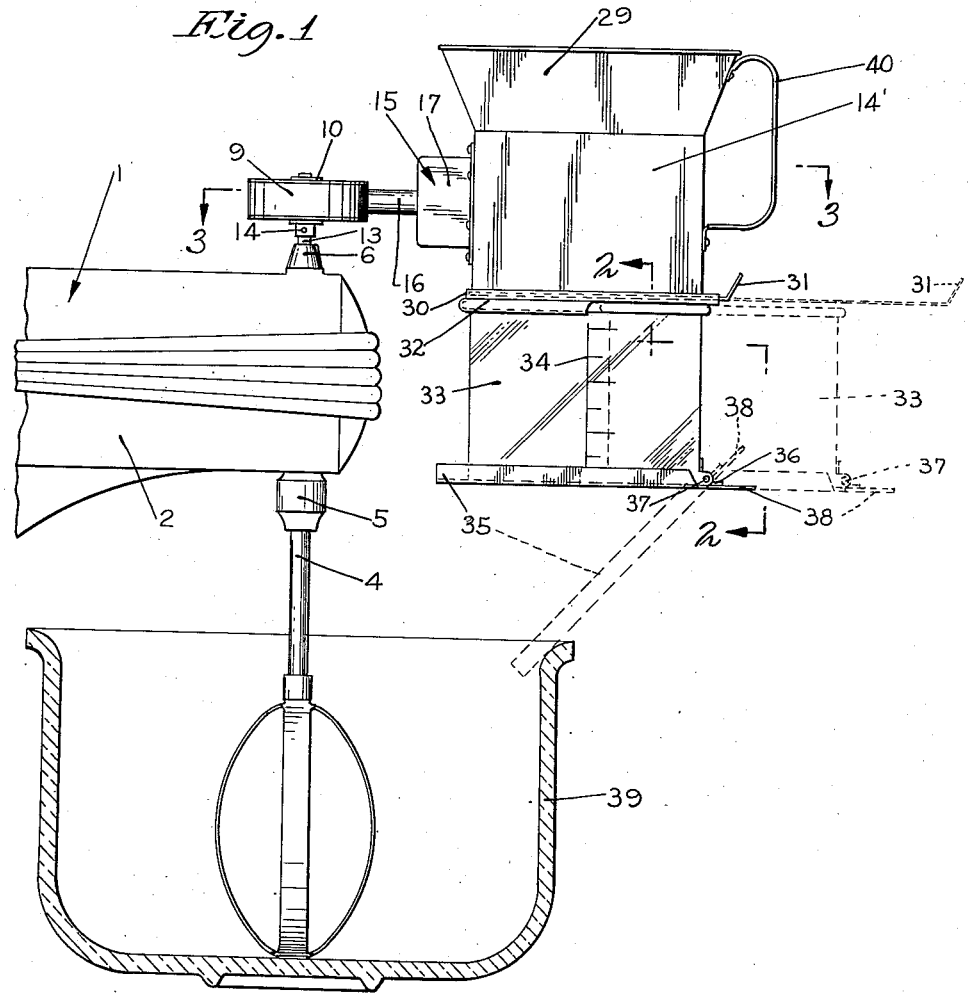
Fig. 1 is a view in side elevation showing my novel sifter attached to a power mixer, some parts being broken away and some parts shown in section.
Figure 2:
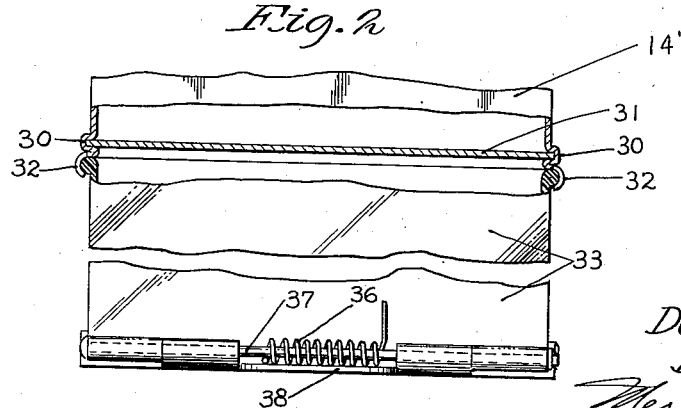
Fig. 2 is an enlarged fragmentary view, partly in side elevation and partly in section, taken substantially on the line 2—2 of Fig. 1.

Referring with greater particularity to the drawings, the numeral 1 indicates in its entirety a portion of a mechanical beater including a motor, not shown but contained within a housing 2, a beater shaft 3, and a beater 4 coupled to the beater shaft by means of a suitable coupling 5. It might here be stated that the beater shaft 3 shown in Fig. 4 is not specifically shown in Fig. 1, but is concealed within the motor housing 2 in alignment with the shaft of the beater 4 and a bearing boss 6 on the upper end of the housing 2. As shown in Fig. 3, the upper end of the beater shaft 3 is conventionally provided with a concentric bore 7 having a cross pin 8 adjacent its upper end.

In accordance with my present invention, I provide a bearing bracket 9, shown as being in the nature of a cylindrical closed housing. Aligned bearings 10 and 11 in the central portion of the bearing bracket 9 journal a cam element 12 for rotary movements within the bracket 9. Preferably, and as shown, a stub shaft 13 is secured fast to the cam element 12 by means of a pin or the like 14. Shaft 13 has a depending lower end which is of a diameter to be received within the bore 7 of the beater shaft 3. Furthermore, the extreme lower end of shaft 13 is slotted to receive the cross pin 8 carried by the beater shaft 3. With reference to Fig. 4, it will be noted that the lower end of shaft 13 is adapted to be journalled in the bearing boss 6 of the motor housing.

The bearing bracket 9, as shown, is secured to the side of a sifter casing 14' by means of a tubular member, identified in its entirety by the numeral 15 and comprising a reduced outer end 16 and an enlarged cup-like inner end 17. A push rod 18 is mounted for reciprocatory movements within the reduced outer end 16 of the tubular element 15, within spaced bearings 19. As shown, push rod 18 has an enlarged head 20 working within the cup-like member 17, and has an outer end 21 which is adapted to be engaged by the cam element 12 within the bracket 9. As shown particularly in Figs. 3 and 4, a plurality of vertically spaced transverse sifter screens 22 are positioned within the sifter casing 14', preferably and as shown, within the vertical limits of the enlarged cup-like element 17. Overlying each of the sifter screens 22 is an agitator element 23 which is mounted for reciprocation within said casing 14', transversely thereof. Each of the agitators 23 is provided with an extended portion 24 which projects laterally through openings 25 in the casing 14' to the interior of the enlarged end 17 of the tubular element 15. The projected ends 24 are interconnected by an E-shaped tie bar 26 riveted or otherwise secured thereto as indicated at 27. A pair of coil compression springs 28 are interposed between the tie bar 26 and the side wall 14' of the sifter, and bias the tie bar 26 toward engagement thereof with the enlarged head 20 of the push rod 18. Engagement of the tie bar 26 with the head 20 causes the push rod 18 to be moved toward the cam element 12 within the bracket 9.

The sifter casing 14' is provided with an outwardly flaring upper edge 29 into which flour to be sifted may be poured. At its lower end, the sifter casing 14' is formed to provide opposed transversely extended grooves 30 which slidably carry a slide valve or gate 31. Below the grooves 30, the sifter wall 14' is formed to provide a flange 32, which supports a removable measuring cup 33. The measuring cup 33 may be made of any suitable material, such as synthetic resin, preferably transparent in nature and provided with graduations indicated by the numeral 34 enabling the operator to observe the amount of material within the cup 33. The lower end of the cup 33 is closed by a hinged cover 35, which is biased toward a closed position by a torsion spring 36 encompassing a hinged pintle 37. The cover 35 is provided with a lateral lip 38, which may be used as a handle means for opening the cover 35 against bias of the torsion spring 36.

It will be seen, particularly by reference to Fig. 1, that when my improved sifter is properly positioned on the mixer, that a portion thereof overlies a mixing bowl 39 properly positioned on the mixer 1. The sifter is provided with a handle 40 by means of which the sifter is manually supported when in use.

When it is desired to utilize my invention, the shaft 13 is inserted through the bearing boss 6 of the housing 2 whereby to operatively engage the beater shaft 3. Rotation of the beater shaft 3 causes the cam element 12 to reciprocate the push rod 13 against bias of the coil compression spring 28. Reciprocation of the push rod 18 is transferred to the agitators 23 to the tie bar to cause flour contained within the casing 14' to be effectively sifted through the screens 22. The handle 40 is held in one of the operator's hands to help support the sifter casing 14' and measuring cup 33 and to prevent the same from swinging about the axis of the shaft 13 and beater shaft 3.

My invention has been thoroughly tested and found to be entirely adequate for the accomplishment of the above objects, and while I have shown a preferred embodiment of my invention, it will be understood that the same is capable of modification without departure from the scope and spirit of the invention as defined in the claim.

What I claim is:

In a device of the class described, a sifter casing having an open top, a cylindrical bearing bracket, a tubular member connecting said bearing bracket to the side of said sifter casing, said tubular element having an enlarged inner end adjacent said casing, a push rod mounted for reciprocatory movements in the reduced end of said tubular element, said push rod having an enlarged head within the enlarged end of said tubular element and having its opposite end projecting into said bearing bracket, a vertically disposed bearing in said bracket, a cam element journalled in said bearing for rotary movements, said cam element adapted to engage the outer end of said push rod within said bracket, a stub power shaft rigidly secured to said cam and projecting downwardly through the bearing in said bracket, a plurality of vertically spaced transverse sifter screens within said sifter casing adjacent the enlarged end of said tubular member, a reciprocating agitator overlying each of said screens, fingers on said agitators working through openings in said casing, said fingers extending into the enlarged end of said tubular member and terminating in a connecting tie bar which is engageable with the head on said push rod, and coil compression springs within the enlarged end of said tubular element intermediate the fingers and biasing said agitators and push rod in the direction of said cam.

DEAN W. PETERSON.

REFERENCES CITED

The following references are of record in the file of this patent:

UNITED STATES PATENTS

| Number | Name | Date |
| --- | --- | --- |
| 1,466,580 | Crawford | Aug. 28, 1923 |
| 2,074,162 | Bowman | Mar. 16, 1937 |
| 2,244,186 | Braun | June 3, 1941 |